Figure 1:
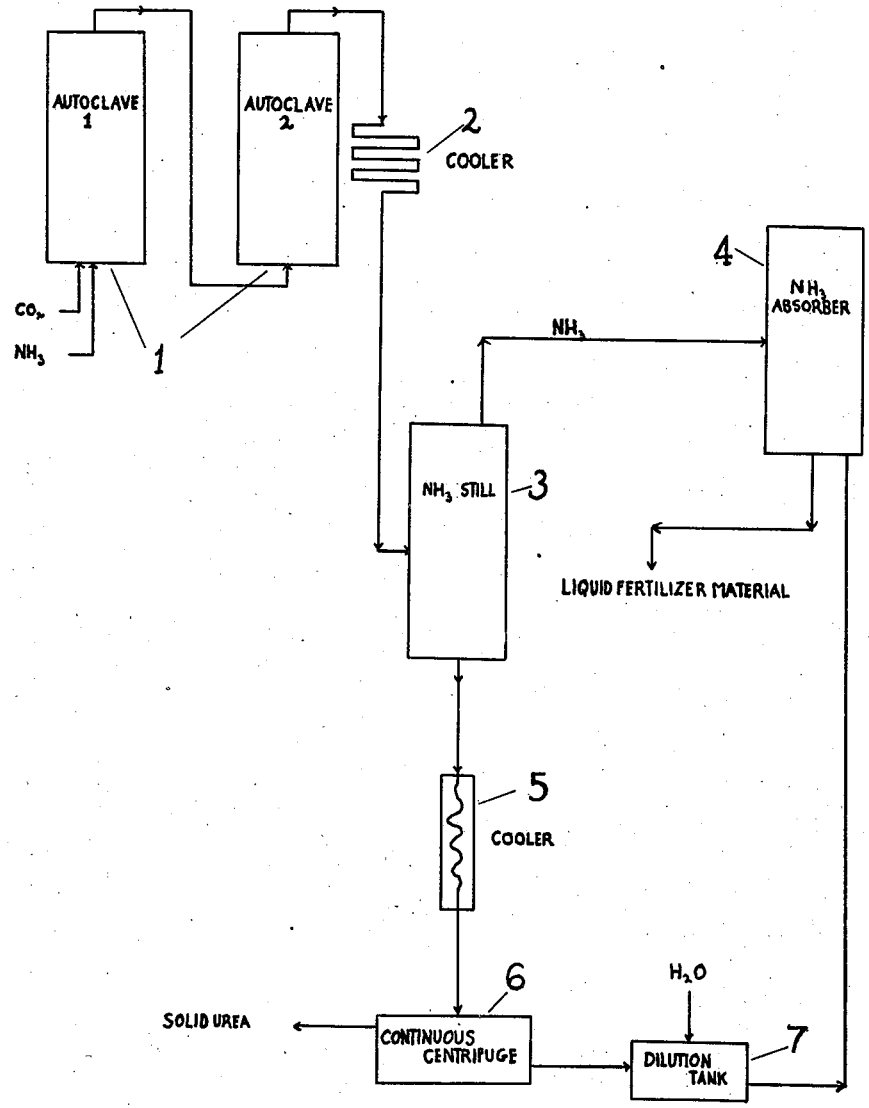

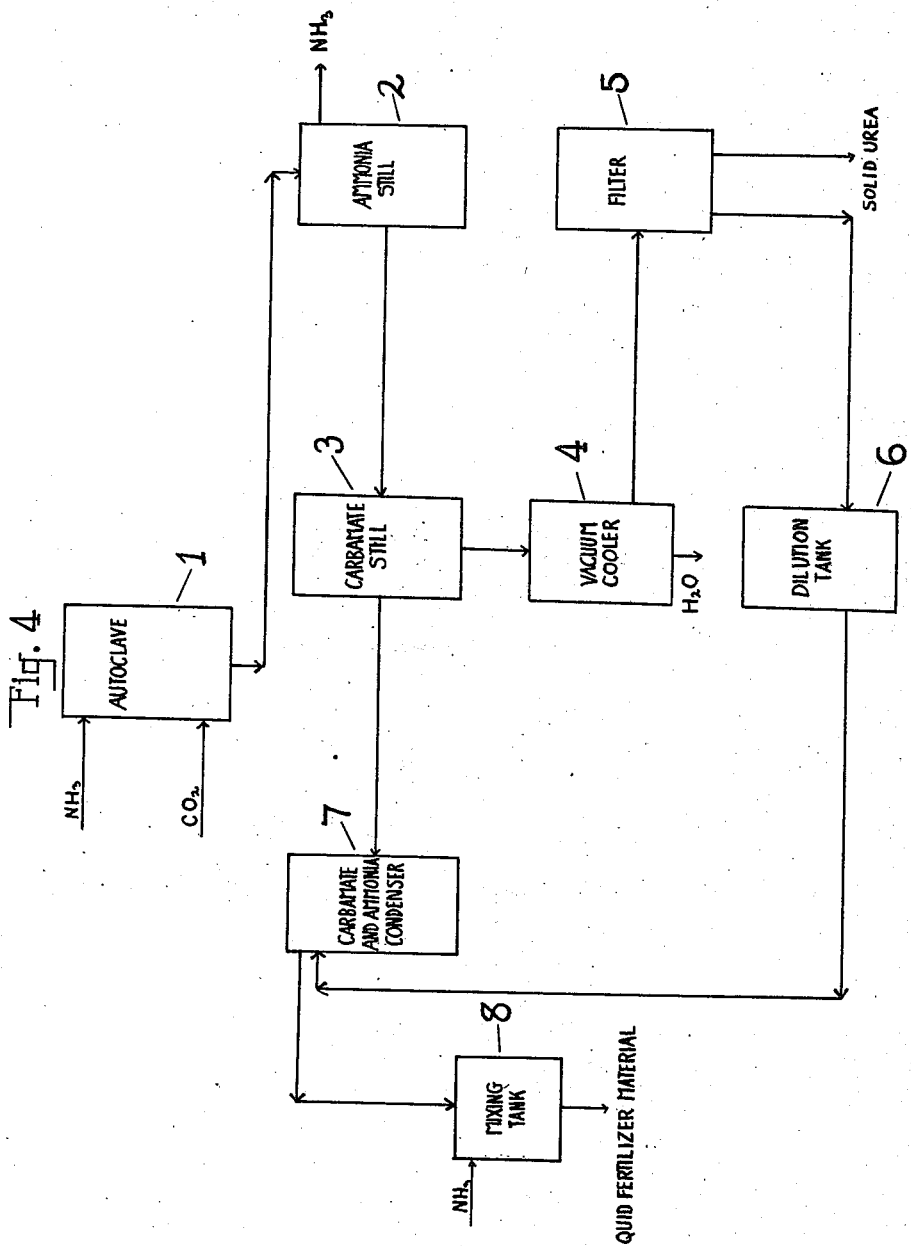

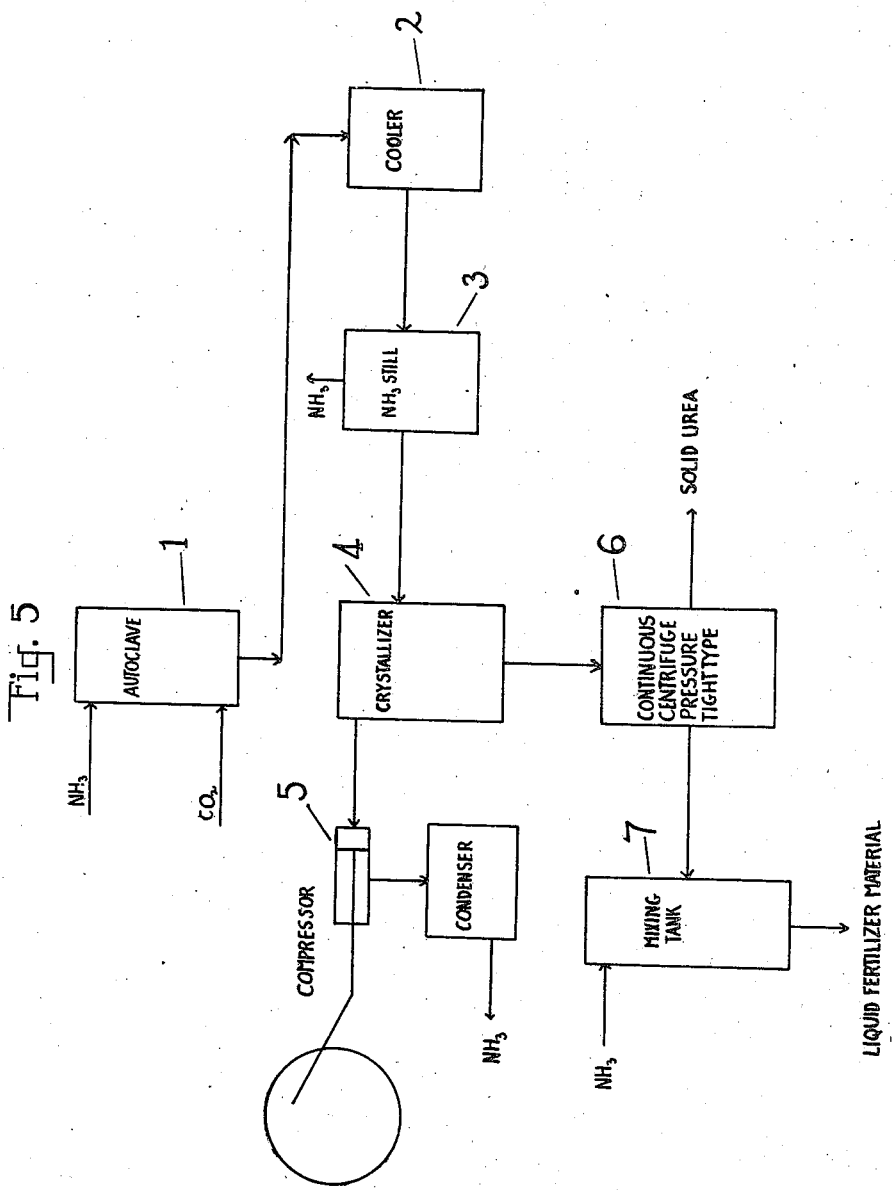

Patented Oct. 15, 1935

2,017,588

UNITED STATES PATENT OFFICE 2,017,588

UREA SYNTHESIS

Harald W. de Ropp and Harry C. Hetherington, Wilmington, Del., assignors to E. I. du Pont de Nemours & Company, Wilmington, Del., a corporation of Delaware Application May 20, 1932, Serial No. 612,474

7 Claims. (Cl. 71—9)

This invention relates to the synthesis of urea from ammonia and carbon dioxide, and more particularly to an improved method for the efficient recovery and utilization of unconverted raw materials.

It is known that when ammonia and carbon dioxide or compounds thereof (i. e. ammonium carbamate, carbonate, bicarbonate, or mixtures of the same) are heated together in a closed system urea is formed. It is also known, however, that in such a process the conversion of reactants to urea is only partial, and, although various means have been proposed for improving the efficiency of the reaction, in no case is complete conversion attained.

In view of the described partial conversion problem in urea synthesis various proposals have, therefore, previously been made to develop a urea synthesis process in which, for example, the unconverted reactants might be separated from the urea melt and returned to the synthesis for conversion with fresh portions of reactants or otherwise utilized.

With a view to overcoming the practical difficulties of the prior art it is an object of the present invention to provide an improved process for the synthesis of urea from ammonia and carbon dioxide or compounds thereof in which solid urea and a useful liquid fertilizer material are simultaneously produced from the synthesis melt, added materials, and the unconverted reaction products.

It is an additional object of the present invention to provide a process for the synthesis of urea and production of a useful liquid fertilizer material wherein the costly recirculation and subjection of ammonium carbamate to further synthesis operations may be obviated.

Other objects and advantages of the invention will be apparent from the following specification in which the details and preferred embodiments are described read in connection with the attached drawings which diagrammatically represent how the invention may be practiced.

According to the present invention the urea synthesis is effected by introducing ammonia and carbon dioxide, either as such or combined as ammonium carbamate, ammonium carbonate, or ammonium bicarbonate, into a suitable closed reaction vessel or vessels, an excess of ammonia over the stoichiometrical requirement for ammonium carbamate being employed. The ammonia and carbon dioxide preferably used may be pumped as a liquid, or forced as a gas, into the autoclave or reaction vessels. The raw materials are therein submitted to the combined effect of urea-forming temperatures and pressures. When the reaction has progressed sufficiently the synthesis melt is removed from the autoclave, or autoclaves, and, according to one preferred embodiment of the invention, the melt is cooled before release of pressure and introduction into ammonia still wherein the unconverted ammonia is substantially eliminated from the melt by distillation. The ammonia removed from the melt is conducted to an ammonia absorber to undergo the treatment and incorporation into a liquid fertilizer material hereinafter described. The product remaining after ammonia distillation and comprising urea, water, and ammonium carbamate is cooled to accomplish the crystallization therefrom of a part of the urea which is removed from the solution (for example, by means of a continuous centrifuge). The urea thus removed from the synthesis melt may be used in any desired manner such as, for example, for immediate incorporation into a fertilizer. The resulting mother liquor, after the centrifuging operation, containing urea, ammonium carbamate and water, is diluted with additional water and passed to an ammonia absorber hereinbefore described where it absorbs the ammonia previously expelled from the ammonia still. The resulting liquid product is admirably fitted as a liquid fertilizer material for use in adding to fertilizing materials such as commercial superphosphate or the like, and contains the desired organic and inorganic nitrogen necessary for the requirements of a complete fertilizer.

According to our invention it is possible to vary within a wide range the proportions of solid urea and its ratio to that contained in the liquid fertilizer material and as well to vary the procedure followed in the production of a desirable fertilizer material and the separation of solid urea from the synthesis melt. Thus, as an illustration, immediately upon removal of the synthesis melt from the autoclave, it may be divided into two separate parts which may be separately treated for the purpose of producing solid urea and a desirable liquid fertilizer material. For example, one part of the synthesis melt may be conducted directly to a mixing tank where it is incorporated with added ammonium carbamate, urea, ammonia, and water obtained after treatment of the remaining part of the synthesis melt, to produce a desirable liquid fertilizer material. The second portion of the synthesis melt may be conducted to an ammonia still wherein a part of the unconverted ammonia may be removed and recirculated, if desired, to the autoclaves for further conversion. The solution remaining after ammonia distillation may be conducted to a second still wherein substantially all residual ammonia and ammonium carbamate are removed from the solution by distillation, the urea and water remaining after ammonia and carbamate distillation being conducted to a vacuum cooler wherein a portion of the water is removed, and concentrated urea-water solution obtained. This solution is conducted to a filter for the removal of the greater part of urea. The mother liquor from such a filter is conducted to a dilution tank wherein further quantities of water are added and thence to a condenser for admixture therein with the carbamate and ammonia distilled from the first carbamate still before conduction to the mixing tank hereinbefore described to which the first portion of urea synthesis melt has been conducted. In this mixing tank to which the solution now containing urea, water, ammonium carbamate and ammonia is passed this solution and the first portion of synthesis melt are thoroughly intermingled to produce a final solution admirably fitted as a liquid fertilizer material for use in adding the necessary organic and inorganic nitrogen contents to a commercial fertilizer.

Among the numerous advantages of our invention it will be seen that the costly steps of reprocessing or resubjecting to synthesis operation of ammonium carbamate has been obviated with the obtention of an economical method whereby it is possible to produce solid urea, a valuable liquid fertilizer material, and at the same time to avoid the disadvantages of previous processes such as hereinbefore described.

Although the invention is susceptible of wide variations in operation and may be applicable to either batch or continuous processes, the synthesis is preferably effected in a continuous manner and it is with reference to a process of this particular kind that the invention is described in the following examples, it being understood that the examples are only by way of illustration and that the invention is not limited to the examples.

*Example 1.*—Referring to Figure 1, the urea synthesis reaction is effected in a pressure- and corrosion-resistant vessel or vessels 1 such as ordinarily used in the synthesis of urea, the same being provided with inlets for raw materials and outlets for withdrawal of reaction products. Into such an autoclave are introduced initially 66.2 parts by weight of ammonia and 44 parts of carbon dioxide. The charge is heated to about 210° C. and maintained under pressure of from, say, 3000-6000 pounds per square inch until little further conversion to urea takes place, i. e. for a varying period of from about 10 to 120 minutes. The synthesis melt is then forced by its own pressure thru cooling coils or the like 2, which lower the temperature of the charge to about 100° C., before release of pressure and introduction into an ammonia still. The charge leaving the autoclave and passing therefrom thru the cooling coils to the ammonia still and comprising about 17.9 parts of ammonium carbamate, 46.1 parts urea, 32.3 parts ammonia, and 13.9 parts water, is subjected to distillation in an ammonia still 3 whereby the excess ammonia is substantially eliminated. The 32.3 parts of free ammonia driven off in the still are conducted to an ammonia absorber 4 and there combined with approximately 17.9 parts ammonium carbamate, 32.2 parts urea, and 19.9 parts of water, which in turn are obtained by subsequent steps of treatment of the autoclave charge as hereinafter described, to produce a desirable liquid fertilizer material.

The solution of 17.9 parts of ammonium carbamate, 46.1 parts urea, and 13.9 parts water remaining in the ammonia still after distillation of ammonia therefrom is thereafter further cooled to about 60° C., by means of cooling coils or the like 5, and approximately 13.9 parts of solid urea which has crystallized from solution at this temperature removed therefrom by means of a continuous enclosed centrifuge or the like 6. The mother liquor remaining after the centrifuging operation and comprising approximately 17.9 parts ammonium carbamate, 32.2 parts urea and 13.9 parts water is further diluted by the addition of 6 parts water in dilution tank 7 and passed to the ammonia absorber 4 wherein it absorbs the 32.3 parts ammonia hereinbefore described as issuing from the ammonia still 3. The resultant liquid, comprising 17.9 parts ammonium carbamate, 32.2 parts urea, 32.3 parts ammonia, and 19.9 parts water, is admirably suited as a liquid fertilizer material, possessing all or the larger part of the nitrogen requirements of the fertilizer industry.

Figure 2:
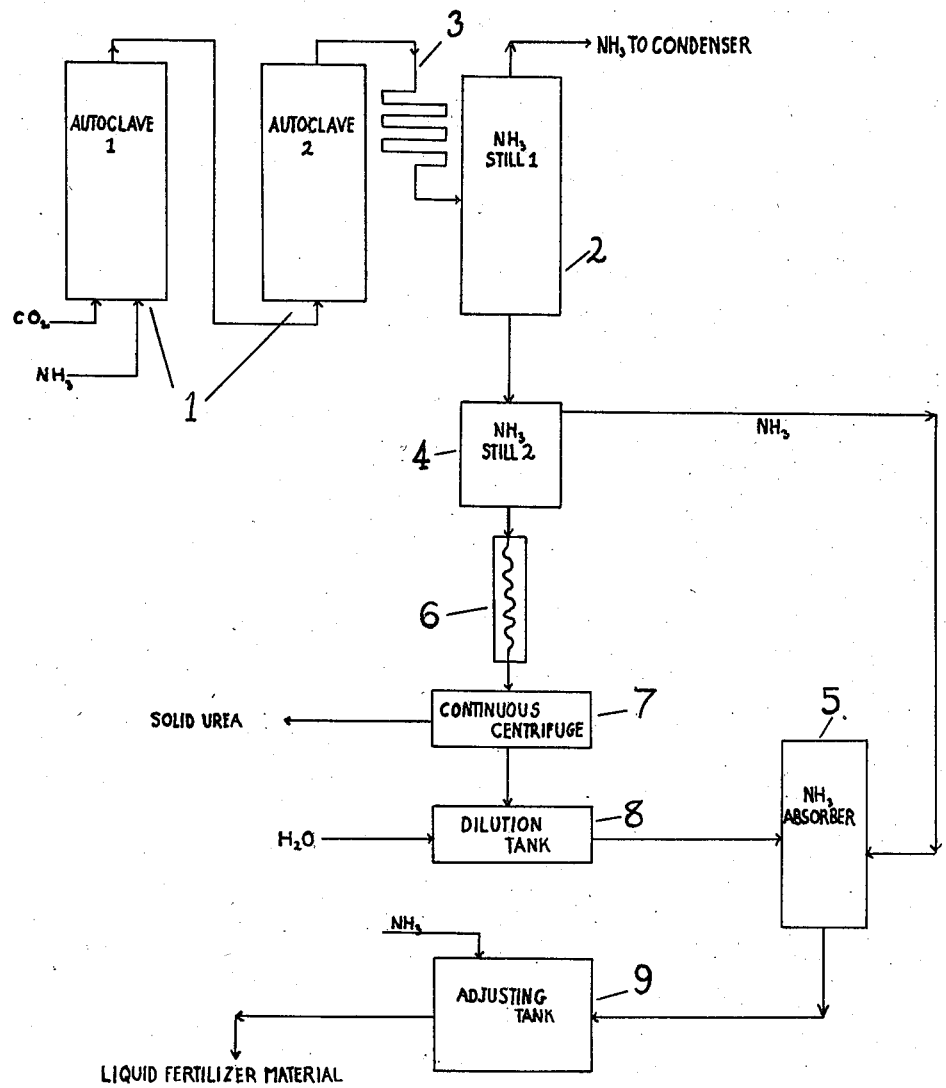

*Example 2.*—Referring to Figure 2, the urea synthesis reaction is effected in a pressure- and corrosion-resistant vessel or vessels 1 such as described in Example 1. Into such an autoclave or autoclaves are introduced initially 81.6 parts ammonia and 44 parts of carbon dioxide, by weight, and the charge is heated to about 190-210° C., and maintained under pressure of from, say, 3000-6000 pounds per square inch until little further conversion to urea takes place. The synthesis melt is then forced by its own pressure into an ammonia still 2, after passage thru coolers such as cooling coils or the like 3 which appreciably lower the temperature of the charge before release of pressure and introduction into said still. The charge leaving the autoclave or autoclaves and passing therefrom thru the coolers to the ammonia still and comprising about 14.1 parts ammonium carbamate, 49.2 parts urea, 47.6 parts ammonia, and 14.8 parts water is subjected to distillation in the ammonia still 2 whereby substantially 28.1 parts ammonia are eliminated, and passed to a condenser or the like. The resulting solution is thereafter passed to a second ammonia still 4 wherein the remaining free ammonia is driven off and passed in turn to an ammonia absorber 5 and treated as hereinafter described. The solution containing 14.1 parts carbamate, 49.2 parts urea, and 14.8 parts water is passed, from the second ammonia still, through a cooler 6 to a continuous centrifuge or the like 7, wherein 23.9 parts crystallized urea are separated therefrom. This urea may be used immediately for incorporation into a commercial fertilizer or the like. The resulting mother liquor consisting of 14.1 parts carbamate, 25.3 parts urea, and 14.8 parts water is thereafter passed to a dilution tank 8 wherein .8 parts of water are added. This diluted liquor is then passed to the ammonia absorber 5 hereinbefore described for absorption therein of the ammonia coming from the second ammonia still 4. The resultant liquor is then passed to an adjusting tank 9 wherein added ammonia is incorporated with the liquor to give a liquid fertilizer material comprising 14.1 parts carbamate, 25.3 parts urea, 25.3 parts ammonia, and 15.6 parts water. This liquid fertilizer material is admirably suited for use in the production of a complete fertilizer and possesses all the desired organic and inorganic nitrogen requirements of the usual commercial fertilizer.

Figure 3:
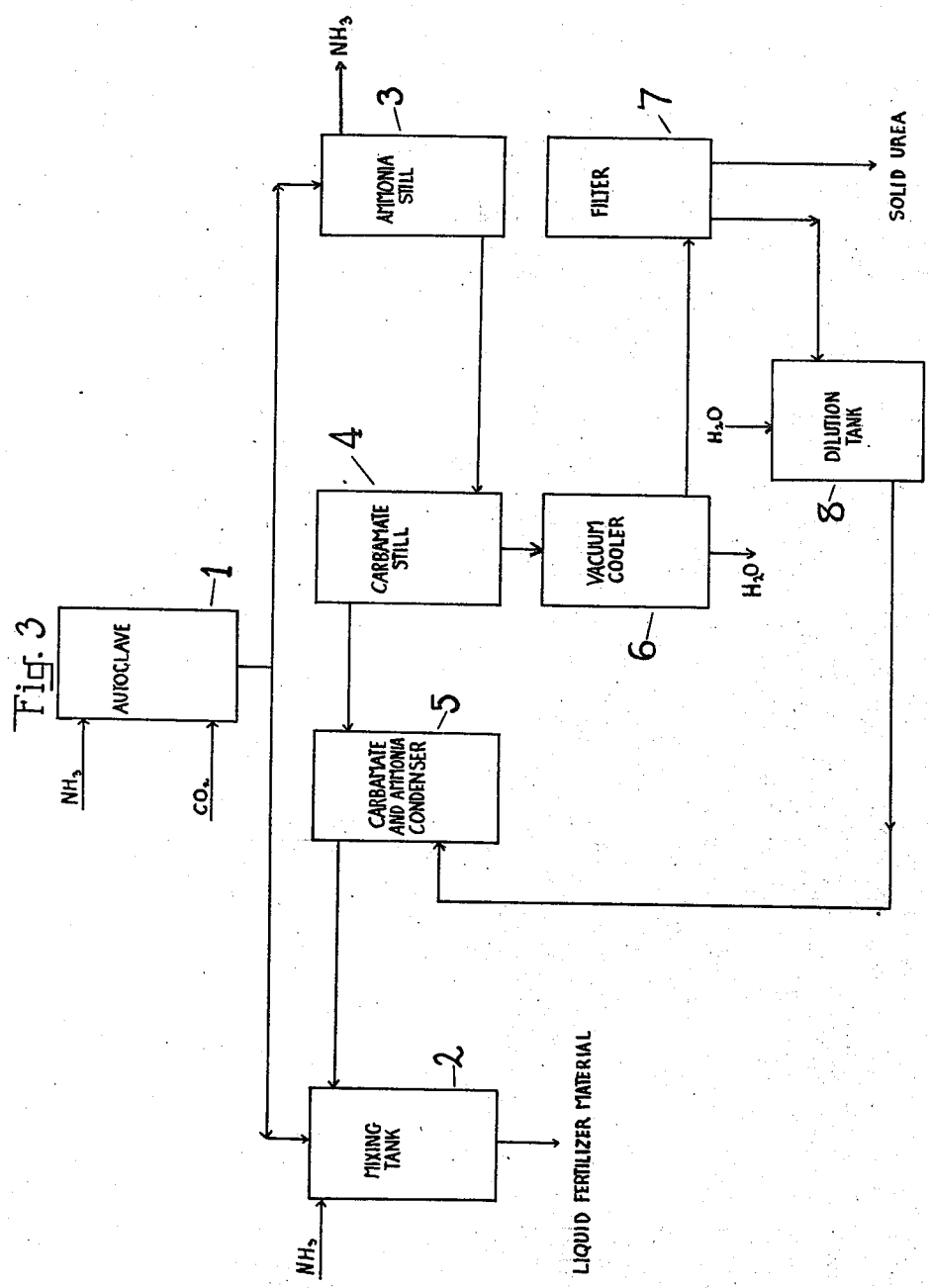

*Example 3.*—Referring to Figure 3, the urea synthesis is effected in an autoclave or vessels 1 such as described in Example 1. Approximately 85 parts by weight of ammonia and 44 parts of carbon dioxide are introduced into an autoclave or autoclaves 1 and subjected to urea-forming temperatures and pressures, as described in Examples 1 and 2. After the urea synthesis operation has progressed sufficiently as described in the preceding example, a urea synthesis melt comprising approximately 13.3 parts of ammonium carbamate, 49.8 parts urea, 51.0 parts ammonia, and 14.9 parts water are removed from the autoclave. This melt is divided into two portions *a* and *b*, respectively,—*a* 3.0 parts carbamate, 11.3 parts urea, 11.6 parts ammonia, and 3.4 parts water; and *b* 10.3 parts ammonium carbamate, 38.5 parts urea, 39.4 parts ammonia, and 11.5 parts water. Portion *a* is conducted directly to a mixing tank 2 where it undergoes treatment hereinafter described. Portion *b* is conducted thru coolers to an ammonia still 3 wherein 37.6 parts of ammonia are eliminated. After elimination of this free ammonia the resulting solution is passed to a carbamate still 4 wherein the ammonium carbamate and the residual quantities of free ammonia are driven off and passed to a condenser 5 wherein they are treated as hereinafter described. The solution comprising 38.5 parts urea and 11.5 parts water remaining after the carbamate distillation is passed to a vacuum cooler 6 maintained at a temperature of approximately 50° C., wherein about 5.3 parts water are removed. The crystal magma remaining after the removal of water in the vacuum cooler and comprising 38.5 parts urea, and 6.2 parts water is passed to a filter 7 where 26.0 parts of solid urea are removed. This urea may be used, if desired, for immediate incorporation in fertilizing materials. The solution remaining after the filtering operation and comprising 12.5 parts urea, 6.2 parts water, is passed to a dilution tank 8 wherein it is mixed with 5.9 parts of added water and passed to the carbamate and ammonia condenser 5 hereinbefore described for absorption of the carbamate and ammonia. The resulting solution, containing 12.5 parts urea, 10.3 parts ammonium carbamate, 1.8 parts free ammonia, and 12.1 parts water, is thereafter passed to the mixing tank 2 where it is incorporated together with 7.7 added parts ammonia with portion *a* of the synthesis melt, hereinbefore described, to give a desirable liquid fertilizer material.

*Example 4.*—Referring to Figure 4, the synthesis operation is effected in an autoclave or autoclaves 1 such as described in Examples 1 and 2. Into such an autoclave or autoclaves are introduced initially 119 parts, by weight, of ammonia and 44 parts of carbon dioxide. The charge is heated as hereinbefore described in Examples 1 and 2 and maintained under these conditions until little further conversion to urea takes place. The synthesis melt comprising 9.8 parts ammonium carbamate, 52.5 parts urea, 85.0 parts ammonia, and 15.8 parts water is forced by its own pressure through a cooler into an ammonia still 2, wherein 83 parts of ammonia are distilled. The synthesis melt from which all but two parts of free ammonia have been removed is thereafter passed to a second still 3 in which it is subjected to further distillation for the purpose of substantially eliminating therefrom all the ammonium carbamate and residual free ammonia. The resulting solution comprising 52.5 parts of urea and 15.8 parts water is passed to a vacuum cooler 4 wherein approximately 7.3 parts water are removed. The crystal magma is then conducted to a filter 5 wherein 35 parts solid urea are extracted, and the remaining liquor comprising 17.5 parts urea and 8.5 parts water and passed to a dilution tank 6 wherein an additional 3.0 parts of water are introduced. The resulting solution is conducted to an ammonium carbamate and ammonia condenser to absorb therein the 9.8 parts carbamate and 2.0 parts ammonia coming over from the previously described carbamate still 3. The final product resulting from this step is thoroughly mixed in a mixing tank 8 with an added 13.5 parts of ammonia to give a desirable liquid fertilizer material comprising 9.8 parts ammonium carbamate, 17.5 parts urea, 15.5 parts ammonia, and 11.5 parts water.

*Example 5.*—Referring to Figure 5, approximately 102 parts ammonia and 44 parts carbon dioxide are subjected in an autoclave or autoclaves 1 to urea synthesis conditions such as described in Examples 1 and 2, until little further conversion to urea takes place. The resulting synthesis melt comprises approximately 11.7 parts ammonium carbamate, 51 parts urea, 68 parts ammonia, and 15.3 parts water. This synthesis melt is cooled by cooling coils or the like 2 to approximately 154° C., and thereafter passed to an ammonia still 3 maintained at a temperature of about 60° C., wherein 42.3 parts of the unconverted ammonia are eliminated. After elimination of unconverted ammonia the resulting solution is passed to a crystallizer 4 maintained at approximately 15° C., wherein the solution is subjected to the action of a suction pump compressor 5 and approximately 18 parts of the remaining free ammonia removed and passed to a condenser 4 or the like during the crystallization operation. The resultant crystal magma is passed to a continuous centrifuge or like device 6 wherein 30 parts of solid urea are extracted. The resultant liquor comprising 11.7 parts ammonium carbonate, 21.0 parts urea, 7.7 parts ammonia and 15.3 parts water is passed to a mixing tank 7 where it is thoroughly mixed with 10.9 parts of ammonia to give a desirable liquid fertilizer material comprising 11.7 parts carbamate, 21 parts urea, 18.6 parts ammonia, and 15.3 parts water.

It will be understood that where reference is made broadly to ammonia and carbon dioxide as raw materials in the appended claims, this is to be taken as including the same as such or in chemical combination. It will be likewise understood that where reference is made in the specification or in the appended claims to synthesis melts, this is to be taken as including the product resulting from subjection of ammonia and carbon dioxide or compounds thereof to urea-forming temperatures and pressures.

Various changes may be made in the methods of operation and details of procedure without departing from the invention or sacrificing any of the advantages thereof.

We claim:

1. In a process for the combined synthesis of solid urea and a liquid fertilizer material from ammonia and carbon dioxide, the steps which comprise distilling the major part of uncombined ammonia from the synthesis melt, removing a substantial part of the urea in solid form from said melt, and adding a relatively small quantity of ammonia and water to the resultant modified melt to produce a liquid fertilizer material.

2. In a process for the combined synthesis of solid urea and a liquid fertilizer material from ammonia and carbon dioxide, the steps which comprise distilling the major part of uncombined ammonia from the synthesis melt, removing a substantial part of the urea in solid form from said melt, and adding a relatively small quantity of ammonia to the resultant modified melt to produce a liquid fertilizer material.

3. In a process for the combined synthesis of solid urea and a liquid fertilizer material from ammonia and carbon dioxide, the steps which comprise distilling the major part of uncombined ammonia from the synthesis melt, removing the ammonium carbamate and residual ammonia from said melt, removing the greater part of urea in solid form from the resultant modified melt, adding a relatively small quantity of water to the resultant solution and mixing the resultant solution with the previously separated ammonium carbamate, and residual ammonia together with additional ammonia to produce a liquid fertilizer material.

4. In a process for the combined synthesis of solid urea and a liquid fertilizer material from ammonia and carbon dioxide, the steps which comprise distilling the major part of uncombined ammonia from a portion of the synthesis melt, removing the ammonium carbamate and residual ammonia from said portion, removing a substantial part of the urea from said portion in solid form, adding a relatively small quantity of water to the resultant modified melt, mixing said modified melt with the previously separated ammonium carbamate and residual ammonia and mixing the resultant solution together with added ammonia with the remaining portion of said synthesis melt to produce a liquid fertilizer material.

5. In a process for the combined synthesis of solid urea and a liquid fertilizer material from ammonia and carbon dioxide, an excess of ammonia over the stoichiometrical requirements being utilized, the steps which comprise distilling essentially all of the uncombined ammonia from the synthesis melt, removing up to 67% of the urea contained in the synthesis melt and adding a relatively small quantity of ammonia to the resultant modified melt, the amount of ammonia added being in such proportions that the finished liquid fertilizer materials will contain about 2 parts inorganic ammonia to 1 part organic ammonia.

6. In a process for the combined synthesis of solid urea and a liquid fertilizer material from ammonia and carbon dioxide the steps which comprise reducing the uncombined ammonia in the synthesis melt to about 25% by weight, removing up to 58% of the urea contained in said melt and adding ammonia to the resultant modified melt in such quantities that the finished liquid fertilizer materials will contain about 2 parts inorganic ammonia to each part of organic ammonia.

7. In a process for the combined synthesis of solid urea and a liquid fertilizer material from ammonia and carbon dioxide, an excess of ammonia over the stoichiometrical requirements being utilized, the steps which comprise removing essentially all of the uncombined ammonia from a portion of the synthesis melt, removing essentially all of the ammonium carbamate and residual ammonia from said portion, removing about 52% of the urea from said portion, adding water to the resultant modified melt, mixing said modified melt with the previously separated ammonium carbamate and residual ammonia and mixing the resultant solution together with added ammonia with the remaining portion of said synthesis melt, the amount of water and additional ammonia added being in such proportions that the finished liquid fertilizer material will contain about 19% to 23% water and will have about 2 parts inorganic ammonia to each part of organic ammonia.

HARALD W. DE ROPP.
HARRY C. HETHERINGTON.